INVENTORS
PHILLIP S. MYERS
OTTO A. UYEHARA

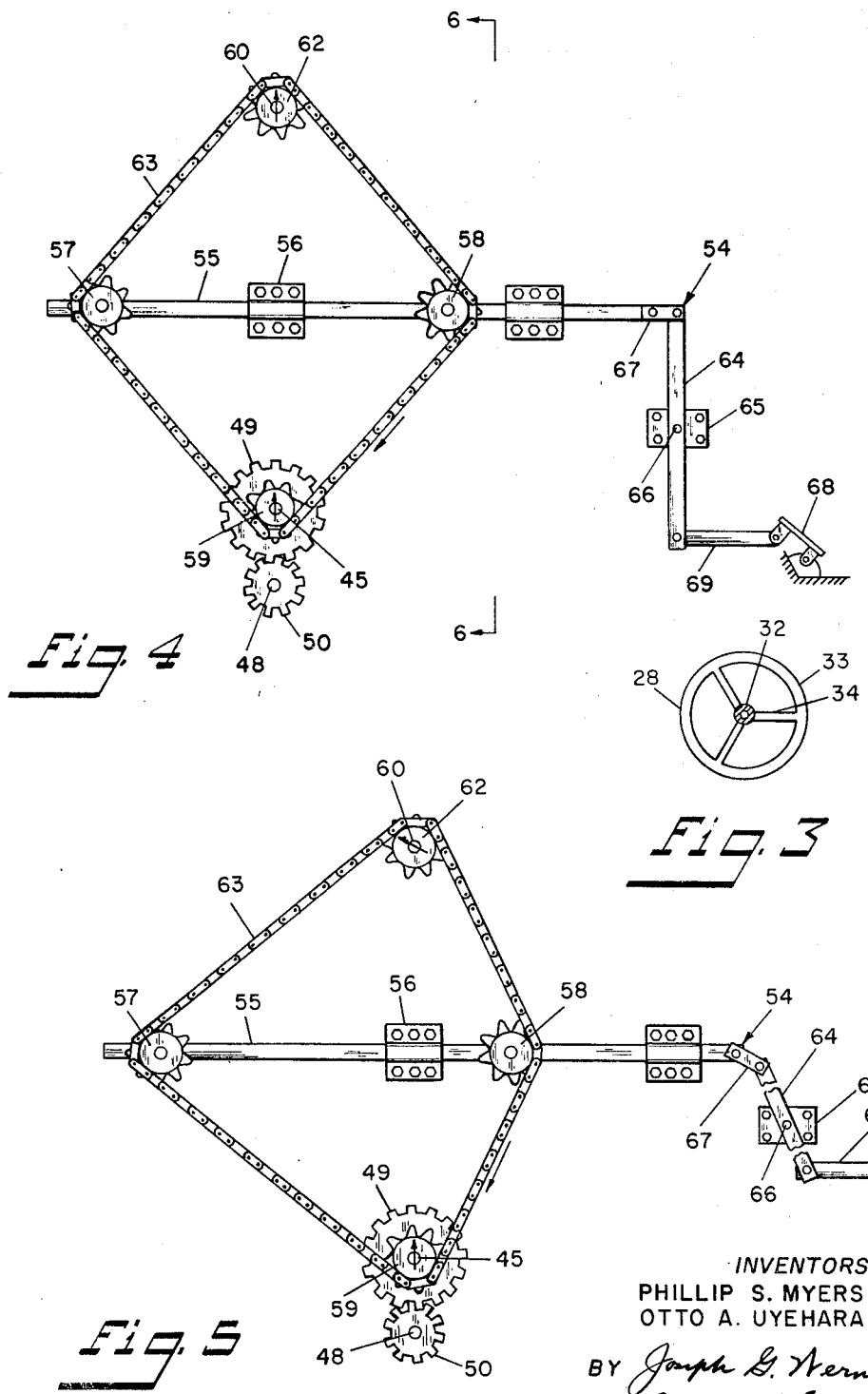

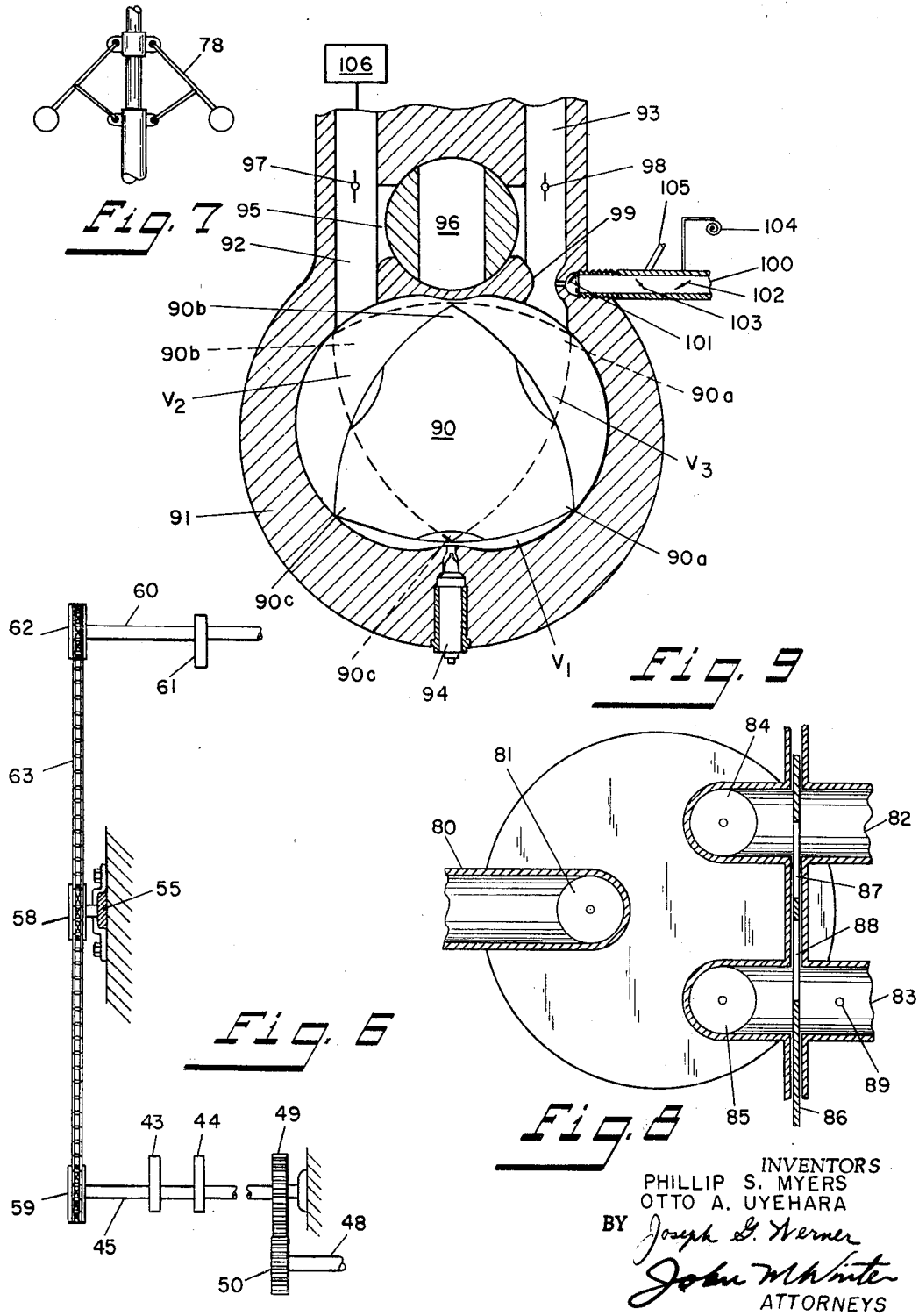

United States Patent Office 3,507,261
Patented Apr. 21, 1970

3,507,261
METHOD AND APPARATUS FOR REDUCING EXHAUST EMISSIONS AND IMPROVING FUEL UTILIZATION IN INTERNAL COMBUSTION ENGINES
Phillip S. Myers, 3210 Oxford Drive, and Otto A. Uyehara, 1610 Waunona Way 53713, both of Madison, Wis.
Continuation-in-part of application Ser. No. 615,145, Feb. 10, 1967. This application June 20, 1969, Ser. No. 835,134
Int. Cl. F02m 25/06, 7/00; F01l 31/16
U.S. Cl. 123—119
10 Claims

ABSTRACT OF THE DISCLOSURE

Method and apparatus for providing a stratified charge of two constituents in the combustion chamber of an internal combustion engine when the engine is operating at less than full load to reduce all three undesirable exhaust emissions, i.e., hydrocarbons, carbon monoxide and oxides of nitrogen. The first constituent of the stratified charge comprises exhaust gas, mixed with air if desired, and the second a fuel and air mixture measurably richer or leaner than the fuel and air mixture which would produce maximum oxides of nitrogen. The exhaust gas/air mixture provided in the combustion chamber should be maintained between the fuel/air mixture and the exhaust port of the engine so that the products from the exhaust gas/air mixture portion of the charge will be exhausted first.

The relative amounts of the two constituents making up the stratified charge are varied in response to accelerator position by auxiliary intake and exhaust valves which are actuated by variable timing control mechanism, with maximum fuel/air mixture and minimum exhaust gas/air mixture being introduced for full engine load, and vice versa for minimum load. The amount of air mixed with the exhaust gas is determined by valve mechanism controlled by engine temperature and accelerator position. The exhaust gas/air mixture and the fuel/air mixture may be drawn into the combustion chamber sequentially or simultaneously.

CROSS REFERENCE TO RELATED APPLICATION

This application is a continuation-in-part of our U.S. patent application, Ser. No. 615,145, filed Feb. 10, 1967.

BACKGROUND OF THE INVENTION

Our invention relates to internal combustion engines and more specifically to a method and apparatus for reducing exhaust emissions from internal combustion engines and improving the fuel utilization of such engines, particularly when operating at less than full load.

In recent years low exhaust emissions have become a controlling criteria for internal combustion engine design. The exhaust from such engines consists of fully-oxidized products of combustion, carbon dioxide, and water vapor, plus partially oxidized, cracked and other hydrocarbons (this group of hydrocarbons herein referred to simply as hydrocarbons), carbon monoxide, oxides of nitrogen, and traces of miscellaneous pollutants. At the present time the fully oxidized products, carbon dioxide, and water vapor are considered inevitable and are not therefore considered undesirable, but the hydrocarbons, carbon monoxide, and oxides of nitrogen, which, with the addition of sunlight, form the constituents of smog, are considered highly undesirable. Legislation setting increasingly restrictive standards for these undesirable emissions has already been passed and it seems inevitable and proper that subsequent legislation will prescribe even lower permissible concentrations for same.

In understanding the prior art and its relationship to the method and apparatus described in this application for patent for reducing undesirable exhaust emissions from spark-ignition internal combustion engines, it will be helpful to first understand where and how these undesirable products are formed.

In regard to the hydrocarbons, it is generally recognized that in spark-ignition engines, the flame originates at the spark plug and spreads outwardly toward the combustion chamber walls, i.e., the head, valves, piston, and cylinder wall. At the completion of burning there is a generally cylindrical "quench zone" adjacent to the walls of the combustion chamber wherein because of the cooling and other effects of the combustion chamber walls, the flame is unable to propagate any further. Since the flame does not completely penetrate this quench zone but the gases in the quench zone have been heated by the adjacent flame, it is believed that a portion of the fuel in the quench zone is only partially oxidized and/or cracked.

Because of the generally cylindrical configuration of the quench zone, when the exhaust valve opens in a conventional spark-ignition engine, the gases in the quench layer next to the valve are expelled first from the cylinder during the exhaust stroke.

The subsequent gases to be expelled come from the center portion of the combustion chamber where the flame has traversed (generally referred to as "bulk gases") and have virtually no or very few hydrocarbons. However, when the piston moves up on the exhaust stroke it scrapes the quench layer off the cylinder walls, and, thus, the last portion of the exhaust gases to be expelled comes from the quench zone and is also rich in hydrocarbons.

In the exhaust port and manifold, mixing of the relatively hot bulk gases and the cooler quench gases occurs and results in further oxidation of the remaining fuel and hydrocarbons. However, unless additional air is added there is only a very limited amount of oxygen available to support this second stage oxidation. Furthermore, there is a rapid decrease in rates of chemical reactions with a decrease in temperature. Thus, the lack of oxygen and cooling in the exhaust port and manifold soon slows down oxidation of the hydrocarbons to a negligibly small rate.

It is known that the thickness of the quench zone depends upon the fuel/air ratio in the combustion chamber. In addition, when fuel/air mixtures with excess air (lean mixtures) are burned, increased oxygen is available during the exhaust process for oxidation of hydrocarbons. Thus, experimentally it is observed that the maximum amount of hydrocarbons is present in the exhaust when burning rich fuel/air mixtures. The remaining fuel and hydrocarbons present in the exhaust emissions decrease as the fuel/air mixture approaches the chemically correct proportions and remains relatively constant as the mixture is made leaner until the misfire limit is approached when they again increase.

The prior art attempts to reduce the hydrocarbon content of the exhaust gases teach the following:

(a) Leaner operation. As will be described more fully hereinafter, this first results in increased concentrations of oxides of nitrogen, although eventually, if extremely lean mixtures are used oxides of nitrogen are decreased.

(b) Increased exhaust temperatures by retarded spark or combustion chamber design. This approach generally means operating the engine in a less efficient manner.

(c) Increased exhaust temperature by means of exhaust port and manifold insulation. However, the insulation increases the temperature of the manifold material, which either causes unreasonably short manifold life or requires the use of exotic, expensive materials. In addition, misfires may cause momentarily large increases in temperatures.

(d) Addition of small amounts of air to the hot exhaust gases in the exhaust port or manifold to provide excess oxygen. Providing precisely the correct amount of air under all operating conditions has proved to be very difficult. Too much air provides too much cooling, which causes the reaction rate to approach zero. One the other hand, too little air provides too little oxygen to support the oxidation. In addition, adequate mixing of the added air and exhaust gases is difficult and residence time in the hot manifold is limited.

(e) Catalytic mufflers. The catalyst provides higher reaction rates at lower temperatures but is subject to fouling and overheating on misfire.

(f) After burners. The exhaust gases with additional air added thereto can be reheated by an open flame at the expense of added fuel consumption plus the difficulties of providing the proper energy input to the flame under wide variations in operating conditions.

(g) Minimizing quench area in the combustion chamber. There is a limit to the area reduction that can be accomplished.

While carbon monoxide (hereinafter referred to as CO) is formed to some extent in the quench gases, CO is also formed in the combustion process. Because of the slowness of some reactions during the expansion process where the temperature is decreasing, CO is present in the bulk gases in considerably larger than equilibrium quantities. All of the above listed prior art techniques for obtaining a reduction in hydrocarbons, except the last, (g), will also decrease the concentration of CO, however, the problems noted are present.

Oxides of nitrogen (hereinafter referred to as NO) are also formed in the bulk gases and during expansion remain at concentrations close to those formed at the peak temperature experienced by the gases. This is due to the very slow rate of the destruction reactions for NO. However, as is apparent from the well known NO-fuel/air ratio curve, NO is affected by changes in fuel/air ratio in an almost inverse manner to the way in which hydrocarbons are affected. Thus, NO concentrations which are low when burning richer than stoichiometrically correct fuel/air mixtures, increase to a maximum at a mixture somewhat leaner than the stoichiometrically correct mixture, and then decrease again when the mixture reaches a still leaner range. Thus, the engine designer is caught in a dilemma—the burning of a rich fuel/air mixtures produces high hydrocarbon and CO concentrations but low NO concentrations, while the reverse is true for moderately lean mixtures. The burning of very lean mixtures may produce relatively low concentrations of both CO and NO but results in ignition problems and low flame speeds and consequently erratic engine operation which makes the use of very lean mixtures somewhat less desirable than rich mixtures at this time.

It is recognized that any process that lowers the peak gas temperature without increasing the oxygen supply will decrease NO concentration. Thus, in the past it has been proposed to introduce exhaust gases into the intake system to serve as a diluent and lower the peak gas temperature. Water has also been suggested for the same purpose. However, any diluent decreases power output. In addition, the recirculated exhaust gases cause undesirable deposits in the intake manifold as well as forming deleterious compounds in the lubricating oil and reduces the range of "smooth" operation. A muffler with a suitable catalyst can reduce the NO but is subject to fouling and overheating. No satisfactory way of eliminating NO emissions is known.

The preceding discussion has assumed steady operation of the engine. In practice, particularly in heavy traffic where emissions are particularly undesirable, the load on the engine varies rapidly. Under these conditions emissions are affected as follows:

(1) Emissions are a function of fuel/air ratio as previously described for steady-state operation.

(2) During deceleration when high intake manifold vacuums are experienced, there is sufficient dilution of the fuel/air mixture with products of combustion that misfiring occurs with obvious effects on emissions.

(3) During rapid acceleration, because the intake manifold pressure is going from a low to a high pressure, it has been found necessary to momentarily introduce additional fuel in order to obtain smooth engine operation. This is done automatically when the accelerator is rapidly depressed. This additional fuel, while necessary for smooth operation, obviously increases hydrocarbon emissions.

In addition, during cold starting and warmup of an engine, it is necessary to provide a very rich liquid-fuel/air ratio in order to obtain a combustible vapor-fuel/air ratio. Thus, during cold starting and warmup of an engine hydrocarbon emissions are increased.

Referring to other attempts to produce a stratified charge, Greuter, U.S. Patent No. 338,399 (1906), teaches stratification of air and fuel/air mixture in an internal combustion engine for economy but does not retain or bring back the exhaust products and consequently does not obtain the low emissions we have described.

West, U. S. Patent No. 1,494,763 (1924), teaches the use of a stratified charge of an exhaust gas/air mixture and a fuel/air mixture but fails to recognize first that such a procedure has the potential of reducing emissions. Furthermore, West does not suggest that if all three undesirable exhaust emittants, namely, hydrocarbons, CO and NO, are to be minimized, the incoming fuel/air mixture must be measurably richer or lesser than that mixture which would produce maximum NO. West likewise does not teach that the portion of the exhaust gas/air mixture which is provided in the cylinder shall be regulated so as to provide sufficient oxygen to complete combustion without excessive cooling which would result in a reduction in reaction rates.

Burnett, U.S. Patent No. 1,481,955 (1924), likewise teaches stratification of the exhaust gas/air mixture with the fuel/air mixture but fails not only to recognize that the incoming fuel/air mixture must be measurably richer or leaner than that mixture which would produce maximum NO if all three undesirable exhaust emittants are to be minimized, but also provides for cooling the exhaust gases before readmitting them to the cylinder. As previously explained minimum heat loss is necessary in order to maintain high chemical reaction rates during the recompression of the recirculated exhaust gases.

There are many patents that teach retainment or reintroduction of exhaust gases or exhaust gas/air mixture without stratification with a fuel/air mixture in the combustion chamber. While this will reduce the amount of NO formed, it will not materially reduce the amounts of hydrocarbons and CO exhausted. In fact this procedure may increase the hydrocarbons emitted since experience shows that for smooth operation the relatively homogeneous mixture of exhaust gases and fuel and air must be richer than if fuel and air alone were burned. Thus, if apparatus were constructed in accordance with the prior art teachings no significant reduction in all emissions would result. At best, either the CO and hydrocarbon pollutants or the NO pollutant, but not all three, would be minimized.

It is clear that a successful method for reducing exhaust emissions must reduce all three undesirable constituents hydrocarbons, CO, and NO and to the best of our knowledge no successful method for eliminating all three is known.

SUMMARY OF THE INVENTION

Basically, our invention comprises a method and apparatus for markedly reducing all three undesirable exhaust gas constituents, namely, hydrocarbons, CO and NO, by producing in the combustion chamber of an internal combustion engine a stratified charge; one portion of which consists of exhaust gas mixed with air, if desired, (hereinafter referred to as exhaust gas/air mixture or EG/A mixture) and the second portion consisting of a fuel and air mixture which must be controlled to be measurably richer or leaner than that fuel and air mixture which would produce maximum NO. The fuel and air mixture which would produce maximum NO will hereinafter be referred to as "maximum NO fuel/air mixture" or "max. NO F/A mixture," while the measurably richer or leaner fuel and air mixture than that which would produce maximum NO will hereinafter be referred to as "minimum NO fuel/air mixture" or "min. NO F/A mixture." It, of course, is understood that said min. NO F/A mixture must be leaner than the rich flammability limit for the fuel and richer than the lean flammability limit.

By burning this min. NO F/A mixture, substantially less NO will be produced than would be produced by the max. NO F/A mixture. The preferred operation will be on the rich side of the NO curve because experience has shown that smoother engine operation is realized using the rich min. NO F/A mixture rather than the lean min. NO F/A mixture.

The combustion of the minimum NO fuel/air mixture will result in little or no formation of NO but hydrocarbons and CO will be formed. However, in accordance with the preferred method of our invention, exhaust gas is expelled from the combustion chamber, mixed with a controlled amount of air, and then reintroduced to the cylinder to form the EG/A mixture constituent of the charge for the next cycle. The EG/A mixture may be introduced sequentially or simultaneously with the min. NO F/A mixture. The EG/A mixture is then recompressed during the subsequent cycle or cycles by the piston and by the exploding min. NO F/A mixture constituent of the stratified charge.

While expulsion and reintroduction of the exhaust gases (after mixing with air) by maintaining the exhaust port open longer than normal is our preferred method, it is also understood that by closing off the exhaust port earlier than normal, it is possible to retain a portion of the exhaust gases in the cylinder and, if desired, mix air therewith prior to the main compression stroke, and that such a method is within the scope of our invention. The EG/A and min. NO F/A mixtures may be introduced sequentially or simultaneously.

As a result of recompression or recompressions of the EG/A mixture constituent of the stratified charge, its temperature and pressure will be increased and because of the approximately logarithmic relationship between temperature and chemical reaction rates, its chemical reaction rate will be markedly increased over that present in the exhaust. Because of the increased reaction rate and the addition of a sufficient quantity of air to complete oxidation, the hydrocarbons and CO are fully oxidized in the cylinder during recompression or recompressions. Thus, the exhaust gas that has been recompressed and finally expelled will have little or no NO because it resulted from originally burning of the min. NO F/A mixture and will now have little or no hydrocarbons and CO because they were destroyed during subsequent recompression or recompressions in the presence of added air and the consequent increased pressures, temperatures and reaction rates.

Thus, if the EG/A mixture that has been recompressed is selectively exhausted, the gases finally going out the exhaust pipe will be completely, or nearly completely, free of all three undesirable emissions, particularly when the engine is running at light or partial load. At full load, little or no reduction of exhaust emissions is achieved, but this is not a series detriment since full load operation of automotive engines is very infrequent while partial or light load operation is, of course, very common.

The relative amounts of two constituents of the stratifide combustion chamber charge, EG/A mixture and min. NO F/A mixture, are varied in response to accelerator position in the preferred embodiment by auxiliary intake and exhaust valves actuated by variable timing control mechanism. The maximum quantity of min. NO F/A mixture and minimum quantity of EG/A mixture is introduced for full engine load, and vice versa for minimum load.

The amount of air mixed with the exhaust gas may be controlled both by a valve assembly responsive to engine temperature and by a valve assembly controlled by accelerator position. The amount of air mixed with the exhaust gas redrawn into the combustion chamber must be sufficient to complete oxidation of the exhaust gases on recompression or recompressions but less than will excessively cool the resulting EG/A mixture and thus reduce the reduction rate. The fact the EG/A mixture is recompressed causing increased temperatures permits much more leeway in the amount of air introduced than when air is merely introduced into the exhaust manifold as in the prior art.

Other objects, features and advantages of our invention will be apparent from the following detailed description taken in conjunction with the accompanying drawings wherein several embodiments illustrating the principles of our invention have been selected for exemplification.

BRIEF DESCRIPTION OF THE DRAWINGS

The drawings are somewhat simplified to illustrate the theory and function of our invention and clearly are not intended to depict all of the components of an internal combustion engine. Only those parts which are necessary for the understanding of our improved method and apparatus have been included.

FIGURE 3 is a top illustration of the auxiliary exhaust valve of FIGURES 1 and 2.

FIGURE 4 is a schematic elevation illustration of a variable timing control mechanism at full load position.

FIGURE 5 is a schematic elevation illustration of a variable timing control mechanism at partial load position.

FIGURE 6 is a sectional illustration taken along line 6—6 of FIGURE 4.

FIGURE 7 is an illustration of an overriding governor such as can be used to control the auxiliary intake valve during deceleration.

FIGURE 8 is a schematic illustration of a second arrangement of a cylinder of a four-cycle internal combustion engine depicting a method and apparatus of our invention.

FIGURES 9–11 are schematic section illustrations showing the operation of a rotary piston internal combustion engine illustrating a method and apparatus of our invention.

DETAILED DESCRIPTION OF THE PREFERRED EMBODIMENTS

Figure 1:
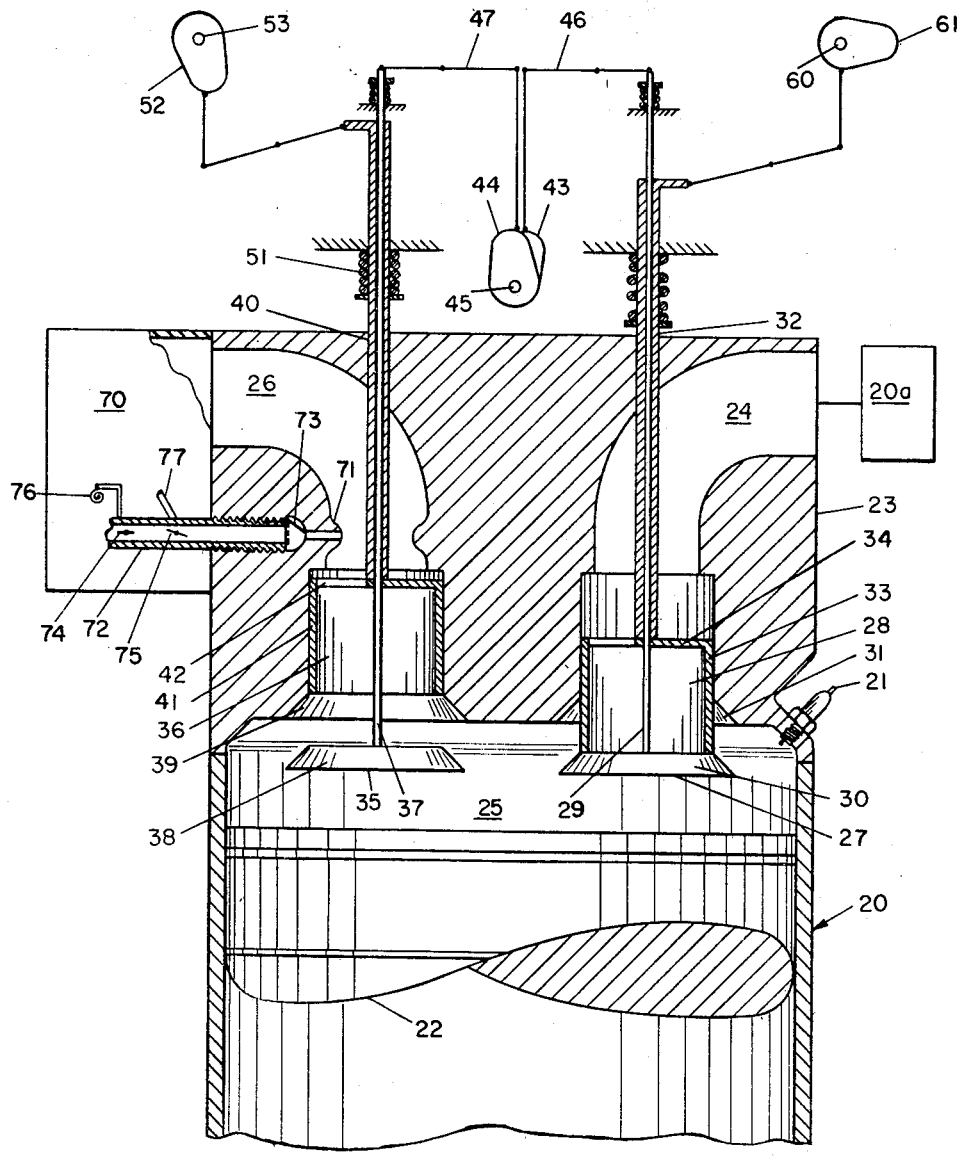
FIGURES 1 and 2 are schematic sectional illustrations of a cylinder of a four-cycle internal combustion engine depicting a method and apparatus of our invention.
Figure 2:
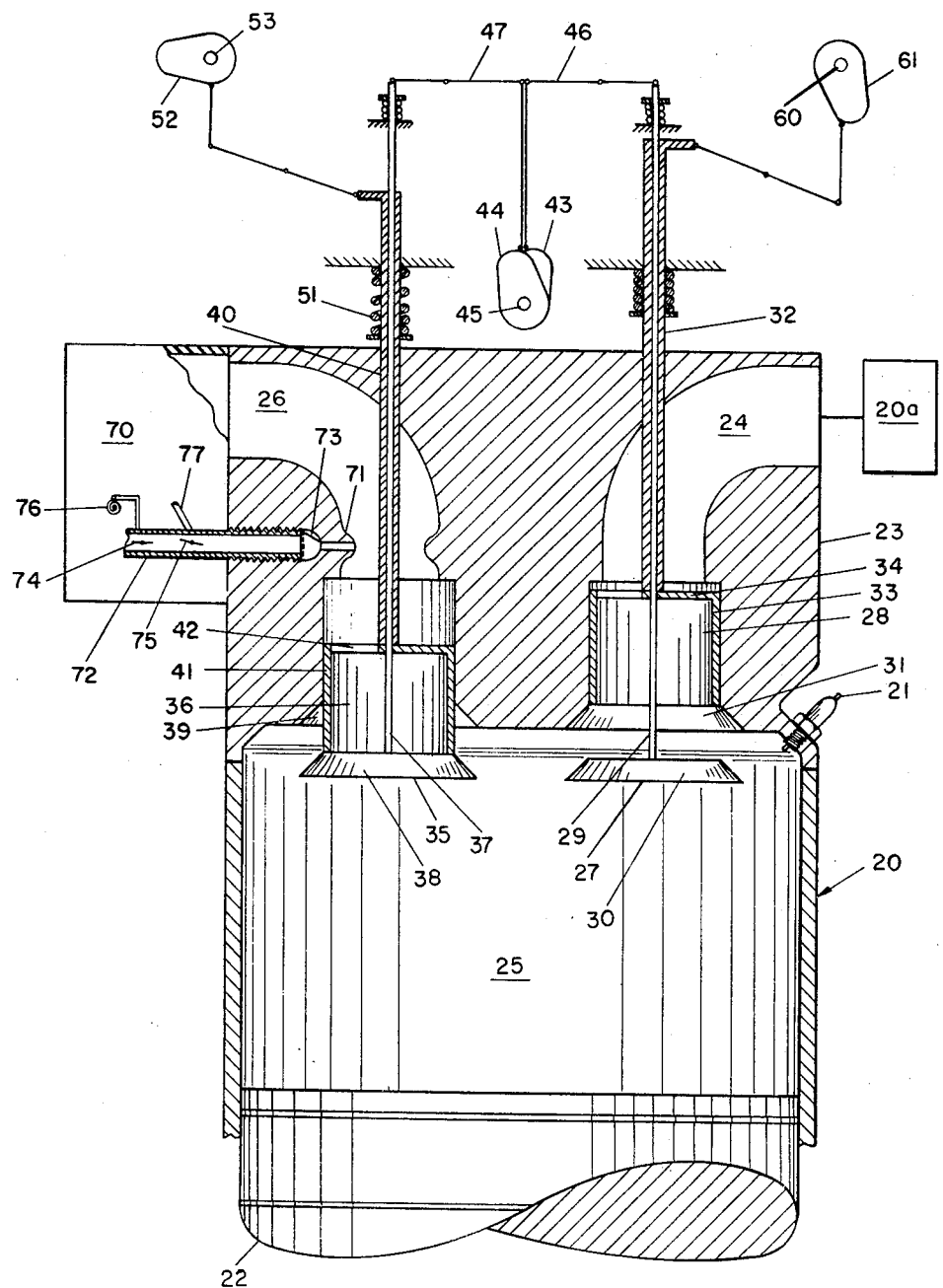

Referring now more particularly to the drawings, wherein like numerals refer to like parts throughout the several views, in FIGURES 1–2 reference numeral 20 represents the cylinder of a four-cycle, spark-ignition, internal combustion engine, the cylinder having a spark plug 21 extending therein and a piston 22 being reciprocal in the cylinder in the conventional manner.

The cylider head 23 has an intake port 24 formed therein for introducing the min. NO F/A mixture into the combustion chamber 25 of the cylinder. The min. NO F/A mixture may be mixed in a conventional carburetor shown schematically at 20a. An exhaust port 26 is formed in the head 23 for exhausting the combustion chamber and subsequently reintroducing an EG/A mixture into the chamber for recompression.

The intake port 24 is controlled by an intake valve assembly comprising a main intake valve 27 and a variably timed auxiliary intake valve 28. The main intake valve 27 of the intake valve assembly has a stem 29 and a circular head 30 adapted to seal against a valve seat 31 formed in the cylinder head 23. The auxiliary intake valve 28 has a tubular stem portion 32 and an open-end tubular or cylindrical head 33. The stem 29 is slideably received in and extends through the tubular stem portion 32 and head 33 of the auxiliary intake valve. The cylindrical head of the auxiliary intake valve is supported from the stem 32 thereof by a spider 34 shown best in FIGURE 3. The auxiliary intake valve is reciprocal in the intake port as shown in FIGURES 1 and 2.

The exhaust port 26 is controlled by an exhaust valve assembly comprising a main exhaust valve 35 and a variably timed auxiliary exhaust valve 36. The main exhaust valve has a stem 37 and a circular head 38 adapted to seal against a valve set 39 formed in the cylinder head 23. The auxiliary exhaust valve has a tubular stem portion 40 and an open-ended tubular or cylindrical head 41. The stem 37 is slideably received in and extends through the tubular stem portion 40 and head 41 of the main exhaust valve in the same manner as in the main intake valve assambly. The cylindrical head of the auxiliary exhaust valve is supported from the stem 40 thereof by a spider 42. The auxiliary exhaust valve is reciprocal in the exhaust port.

As shown in FIGURES 1 and 2, the main intake and exhaust valves 27 and 35 are operated by cams 43 and 44, respectively, mounted on a main camshaft 45 by raising and lowering the valve stems 29 and 37 thereof through conventional rocker arms 46 and 47 shown schematically. As shown in FIGURES 4–6, the main camshaft 45 is driven from the crankshaft 48 of the engine by means of gears 49 and 50 having a two to one drive ratio for a four-cycle engine.

It is very advantageous to minimize the volume between the main valves and their associated auxiliary timing valves positioned in series therewith in order that the auxiliary timing valves can truly control the introduction or, reintroduction, as the case may be, of constituents into the combustion chamber. For example, if as in the prior art, there is significant volume between a main intake valve and an auxiliary valve positioned in series therewith, the min. NO F/A mixture would pass out of the volume btween these valves when the main intake valve is opened and the auxiliary valve is closed. This is undesirable since it would increase the time for and the possibility of mixing of the min. NO F/A mixture with the EG/A mixture used to produce the desired stratified charge.

In the intake and exhaust valve assemblies shown, there is zero volume between each main valve and its associated auxiliary valve when the auxiliary valve is closed because the head of the auxiliary timing valve seals against the head of the main valve.

Since the auxiliary timing valves 28 and 36 and their associated main valves 27 and 35 are disposed in series, (the main valves being positioned between the combustion chamber and the auxiliary timing valves) the sealing requirements of the auxiliary timing valves are minimal and the pressure differentials they must withstand are small. Accordingly, they can be very light in construction to permit easy variation in timing as required. Furthermore, the auxiliary timing valves do not require special valve seats since their primary function is timing rather than sealing and a close clearance between the open-ended tubular heads of these valves and the wall of the intake and exhaust ports in which they reciprocate provide a sufficient seal.

As shown in FIGURE 1, the main intake valve 27 is in its open position, however, passage through the intake port is closed by the auxiliary intake valve 28. The exhaust port is open. In FIGURE 2, the main intake valve 27 is open and the auxiliary intake valve 28 is in its upper or open position thereby opening the intake port. The exhaust port is now closed by auxiliary exhaust valve 36. As shown, a compression spring 51 encircles the upper end of the stem of each of the auxiliary timing valves for urging the head thereof downwardly into contact with the head of the main valve with which it is associated. The cylindrical head of each of the auxiliary timing valves seals against the wall of the port in which it is located and against the head of main valve with which it is associated to cut off passage through the intake and exhaust ports.

Cam 44 by which the main exhaust valve 35 is operated is designed not only to hold the main exhaust valve open during the entire exhaust stroke in the usual manner, but it also holds that valve open during the entire intake stroke to permit the introduction of a quantity of EG/A mixture into the combustion chamber as the piston descends. The auxiliary exhaust timing cam 52 on auxiliary camshaft 53 is designed with a broad nose similar to that of main exhaust valve cam 44 and the main and auxiliary exhaust valves will open and close simultaneously when these cams are operated synchronously. The quantity of EG/A mixture admitted to the combustion chamber is determined by the duration that the exhaust port is held open during the intake stroke. Flow through the exhaust port is controlled by auxiliary exhaust valve 36 which may be closed down on main exhaust valve 35 sometime before the main exhaust valve closes at the end of the intake stroke.

The main intake valve 27 operates in the conventional manner. Auxiliary intake valve 28 associated in series therewith is variably timed so as to permit shortening of the duration that the intake port is open when the duration that the exhaust port is open is being lengthened, and vice versa, so that the quantity of min. NO F/A mixture admitted will always be complementary to the quantity of EG/A mixture admitted. This provides for substantially equal operating pressures in the combustion chamber at the start of the compression stroke at all ranges of engine load.

While it is recognized that various means may be employed for controlling the operation of auxiliary timing valves 28 and 36 in the manner described above, we have illustrated in simplified drawings, FIGURES 4–6, a phase control mechanism 54 to exemplify the operating principle.

The phase control mechanism has a slidebar 55 mountted for reciprocal movement in a pair of stationary slide brackets 56. The slidebar carries a pair of idler sprockets 57 and 58. A drive sprocket 59 is mounted on the main camshaft 45 for rotation therewith. An auxiliary camshaft 60 carrying auxiliary intake timing cam 61 for actuating the auxiliary intake timing valve 28 also has a sprocket 62 mounted thereon for rotation therewith. The auxiliary camshaft 60 is driven by drive chain 63 trained over sprockets 57, 58, 59 and 62. A pivot lever 64 is pivotably mounted on a stationary bracket 65 by the pin 66 and is attached to one end of the slidebar 55 by linkage member 67 and to accelerator pedal 68 by linkage member 69.

From FIGURES 4 and 5 it will be seen that the main camshaft 45 is driven by and bears a fixed rotational relationship to the crankshaft 48 of the engine, and thus, its operation is directly related to piston position. On the other hand, auxiliary camshaft 60 bears a variable rotational relationship to the crankshaft 48 and to the main camshaft 45. The variable rotational relationship is determined by the position of slidebar 55, which, in turn is controlled by the positioning of the accelerator pedal 68. This variable relationship can be most readily visualized by considering main camshaft 45 to be fixed in FIGURE 4 (not rotating) and then moving slidebar 55 to the left as in FIGURE 5 which will decrease the distance between sprockets 58 and 59 and between sprockets 58 and 62 and increase the distance between sprockets 57 and 59 and between sprockets 57 and 62, whereby the resulting adjustment of chain 63 will cause the auxiliary camshaft 60 to be rotated out of phase in a counterclockwise direction with respect to main camshaft 45. Thus, it is readily apparent that the rotational relationship of the auxiliary camshaft 60 for operating the timing valve 28 is variable with respect to crankshaft 48 and that the phase relation therebetween is determined by accelerator position, while the main camshaft 45 has a fixed rotational relation with respect to the crankshaft of the engine.

FIGURE 4 shows the phase control mechanism 54 in the operating position that it would assume when the engine is operating at full load. As indicated by the phase control arrows on sprockets 59 and 62, at full engine load and main camshaft 45 and auxiliary camshaft 60 are rotating in phase whereby the main intake valve 27 and the auxiliary intake timing valve 28 are operating synchronously. As the operator of the engine lets up on the accelerator 68 to decrease the engine load, the pivotal movement of the accelerator is transmitted into linear movement by slidebar 55 whereby the auxiliary camshaft 60 and main camshaft 45 assume an out of phase relationship such as shown in FIGURE 5 wherein the engine is operating at partial load.

The new position of the phase indicating arrows on sprockets 59 and 62 shows the "lagging" relationship of the auxiliary camshaft 60 to the main camshaft 45 whereby the auxiliary intake timing valve 28 is opened later in the cycle than the main intake valve 27 when the engine is operating at less than full load.

Like intake valves 27 and 28 the exhaust valves 35 and 36 may be actuated out of phase with each other by means similar to that shown in FIGURES 4-6 except that the auxiliary exhaust valve is actuated to close earlier in the engine cycle than the main exhaust valve. As set forth hereinbefore the main exhaust valve 35 is held open during the entire intake stroke. When the engine is operating, the auxiliary exhaust valve cuts off admission of EG/A mixture through the exhaust port before the closing of the main exhaust valve to provide a quantity of EG/A mixture in the combustion chamber which will be complementary with the quantity of min. NO F/A mixture admitted during the remainder of the intake stroke after the auxiliary exhaust valve has closed down on the open main exhaust valve. This may be accomplished with mechanism like that shown in FIGURES 4-6 so that when the engine is to be operated at less than full load, the closing of the auxiliary exhaust valve 36 will "lead" the closing of the main exhaust valve 35 by an amount determined by the positioning of the accelerator pedal 68.

In accordance with our invention, it is normally desirable to mix a regulated amount of air with the exhaust gas prior to redrawing of the exhaust gas into the combustion chamber for recompression. The quantity of air introduced is controlled so as to provide a sufficient amount to complete oxidation of the exhaust gases being returned to or retained in the combustion chamber for recompression but less than that which would excessively cool the resulting EG/A mixture and thus result in an excessive reduction of the reaction rate.

As mentioned hereinbefore, the preferred method is to exhaust the combustion chamber and then redraw a portion of the exhaust gases while an alternative method is to close the exhaust timing valve early in the exhaust stroke thereby trapping a portion of the exhaust gases in the chamber. In this latter method, a pressure controlled intake timing valve can be employed to open when the pressure on re-expansion of the compressed exhaust gas mixture falls below the intake pressure.

In the preferred embodiment illustrated in the drawings, the air is automatically introduced and mixed with the exhaust gases both as these gases are expelled from and redrawn into the combustion chamber. The exhaust gases expelled from the combustion chamber pass into an insulated exhaust chamber 70 from which a portion of the exhaust gases are then redrawn through the exhaust port 26 into the combustion chamber for recompression.

The introduction of air into the exhaust gases is accomplished by a venturi 71 formed in the exhaust port above the exhaust valve assembly. An air line 72 is provided in the venturi throat whereby air is drawn into and mixed with the exhaust gases both as the exhaust gas is passing upwardly through the venturi and as they are being redrawn through the venturi back into the combustion chamber. A check valve 73 is provided in the air line to prevent exhaust gases from escaping through the air line during any portion of the engine cycle when the pressure in the exhaust port is greater than atmospheric.

It is understood that the air could be supplied at different locations in the exhaust port (although the preferred point of introduction is close to the exhaust valve) and that it can be introduced by other means such as an air pump rather than a venturi.

It is preferable to vary the amount of air introduced with engine temperature and load since the "richness" of the mixture varies with these parameters. In FIGS. 1 and 2, the quantity of air introduced into the exhaust gases before reintroduction of the gases into the combustion chamber is controlled by two butterfly-type valves 74 and 75 in the air line 72. The opening of valve 74 is controlled by engine temperature through a bimetallic choke spring 76. Since an engine runs rich on cold startup, the bimetallic choke spring will open valve 74 fully when the engine is cold to supply additional air and will close partially as the engine temperature increases.

The opening of the second butterfly-type valve 75 is controlled by accelerator position through the variable timing control mechanism. The lever arm 77 shown in FIGURES 1 and 2 is actuated by the slidebar in such a maner that the valve 75 is fully open when the engine is running at minimum load since a relatively rich mixture is normally supplied for idling and a maximum amount of EG/A mixture is desired at that operating condition and a minimum amount of min. NO F/A mixture is required. When the engine is running at full load no exhaust gases will be drawn back into the combustion chamber, and valve 75 will be adjusted to let the amount of air enter the exhaust port which will give the best balance between cooling due to the air and increased oxygen to give minimum emissions. The variation of the opening of valve 70 with load will always be adjusted to produce minimum emissions at all loads.

It should be understood that our invention will aid in minimizing emissions under conditions where the load is varying rapidly. For example, no throttle is needed in the carburetor in our invention since engine output is determined by valve timing or position rather than by throttling as in the usual carbureted engine, and therefore our intake manifold operates at essentially constant pressure regardless of load. Thus, the addition of extra fuel with its increased emissions normally required of a throttled engine upon sudden load application or vehicle acceleration with a consequent sudden rise in intake manifold pressure is not needed in our system. In addition, during deceleration the intake timing valve 28 can be controlled by an overriding fly-ball governor such as is shown at 78 in FIGURE 7, so that no min. NO F/A mixture is admited, with the charge in the cylinder then consisting entirely of exhaust gases plus small amounts of air, with a consequent reduction in emissions during unsteady engine operation. It will be recognized, of course, as idle speed is approached on deceleration the intake timing valve should be again operated to provide sufficient min. NO F/A mixture to keep the engine from stalling with operation under these conditions being normal idle operation.

It should be understood that our invention is not limited to spark ignition engines or to engines utilizing carburetors to form the min. NO F/A mixture. The invention is equally applicable to diesel engines and to engines with fuel injection systems. In the latter case, the min. NO F/A mixture could be formed in the cylinder with the intake valve assembly described controlling only the admission of air. The fuel injection might be coordinated with the opening and closing of the auxiliary intake timing valve 28, or, if injection is into the intake manifold, it could be continuous. For intermittent injection, the fuel injector would preferably be near the intake port or in the cylinder and aimed to direct the fuel so as to mix with the stream of incoming air or with the already introduced air if injection occurs during the compression stroke. An injector placed concentrically within the main intake valve 27 would be very satisfactory.

In the case of a diesel engine, the intake valve would control the admission of air only and the fuel would be injected into the air portion of the $EG/A$ and air charge.

As mentioned hereinbefore, the $EG/A$ mixture and the min. NO $F/A$ mixture may be drawn into the combustion chamber simultaneously. One manner of accomplishing this is illustrated in FIGURE 8 for exemplification wherein the cylinder has an exhaust port 80 controlled with conventional poppet exhaust sealing valve 81 and having a min. NO $F/A$ intake port 82 and an $EG/A$ intake port 83 having intake sealing valves 84 and 85, respectively. At full load, min. NO $F/A$ mixture may be drawn in through both ports 82 and 83. The intake sealing valves are controlled as a conventional intake poppet valve would be. This system facilitates maintaining of the $EG/A$ mixture between the min. NO $F/A$ mixture and the exhaust valve whereby the products from the $EG/A$ mixture portion of the charge will be exhausted before the products from the min. NO $F/A$ mixture portion, some of which will be trapped or redrawn into the combustion chamber thus resulting in minimum total emissions.

Exhaust port 80 is in communication with the $EG/A$ intake port 83 for supplying hot exhaust gases thereto for redrawing into the cylinder. Air mixed with the exhaust gases before the exhaust gases are reintroduced into the cylinder. As illustrated in FIGURES 1 and 2, the amount of air mixed with the exhaust gases is controlled by valve mechanism controlled by engine temperature and accelerator position.

A load control valve, here comprising a reciprocal slide 86, extends transversely across the intake ports 82 and 83 for controlling the flow area thereof. As shown in FIGURE 8, the slide valve has a first aperture 87 for registering with the min. NO $F/A$ intake port 82 and a second aperture 88 for registering with the $EG/A$ intake port 83. The $EG/A$ intake port 83 has an air inlet 89 formed therein for admitting additional air.

When the engine is to operate at partial load, assuming for example about one-half load, the load control valve 86 would be moved to the approximate position shown in FIGURE 8 by a slide member such as 55 shown in the control mechanism in FIGURES 4-6.

In FIGURE 8, the aperture 87 is in partial registry with the intake port 82 for admitting a partial charge of min. NO $F/A$ mixture and the other aperture 88 is in partial registry with the $EG/A$ intake port 83 for admitting a partial charge of $EG/A$ mixture. Thus, the valve 86 acts as a metering or flow area control valve opening and closing the two intake ports proportionately to simultaneously admit the desired amounts of min. NO $F/A$ mixture and $EG/A$ mixture into the combustion chamber for partial engine loads.

Figure 10:
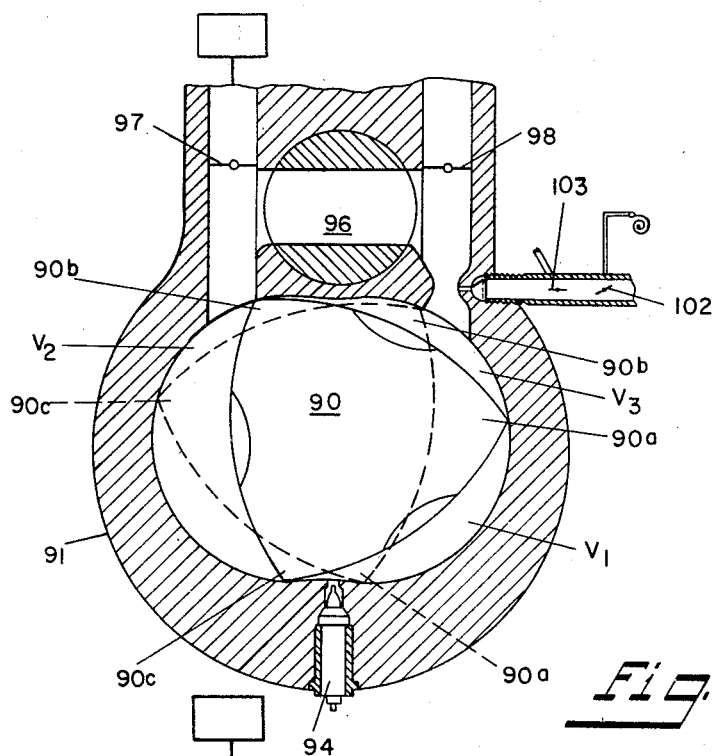
Figure 11:
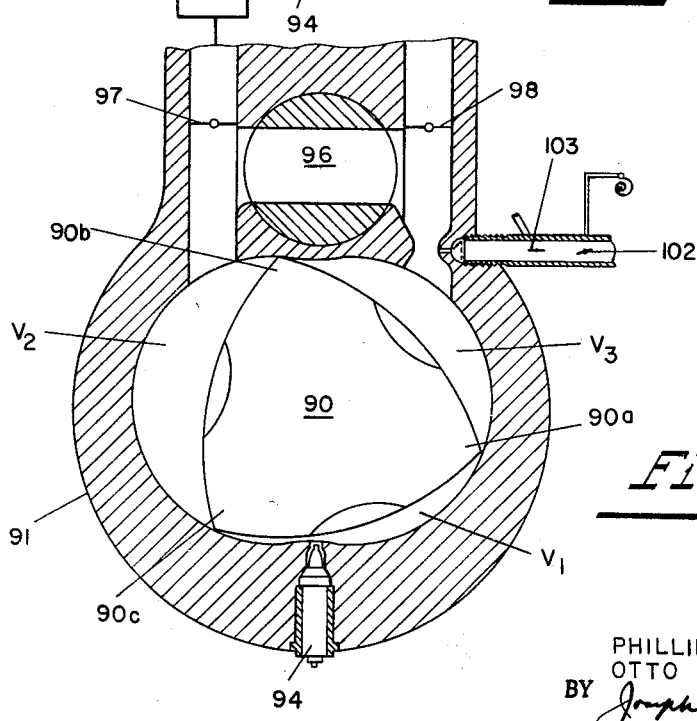

Our invention as it might be incorporated in a rotary piston engine such as, a Wankel engine described in U.S. Patent No. 2,988,065, is shown in FIGS. 9-11 wherein the last portion of the products of combustion leaving the exhaust chamber is diverted into the intake port together with additional air mixed therewith and then introduced into the adjacent intake chamber for recompression.

As shown in FIGURE 9, typically a rotary engine has a generally triangular rotor 90 mounted for counterclockwise rotation in a two-lobed epitrochoidal casing 91, an intake port 92, an exhaust port 93 and a spark plug 94. While this clearly is not an exhaustive description of a rotary engine, it is sufficient for a concise explanation of our invention for achieving increased combustion efficiency and a reduction of undesirable exhaust emissions. A complete and detailed description of rotary engines appears in the above mentioned patent to Wankel.

The general functioning of our improved rotary engine can best be understood by referring to FIGS. 9-11 showing various rotor positions during engine operation. The engine has three chambers described by the three sides of the rotor 90 and the corresponding subtended arcs of the casing 91. These chambers are designated as $V_1$, $V_2$, and $V_3$ in the drawings. In FIGURE 9, chamber $V_1$ is the combustion chamber wherein a compressed $F/A$ mixture is approximately at the point of ignition. In chamber $V_3$, products of combustion are being exhausted out of the exhaust port 93. The exhaust process will continue in chamber $V_3$ until the apex 90a of the rotor 90 travels beyond the exhaust port 93. In accordance with our method of operation, a min. NO $F/A$ mixture with our method of operation, a min. NO $F/A$ mixture is being drawn into intake chamber $V_2$ and will be sealed therein when apex 90b slides past the intake port 92.

In order to divert a portion of the exhaust gas from the exhaust chamber $V_3$ into the intake chamber $V_2$ together with a controlled amount of additional air, we provide an interconnecting channel 95 between the exhaust port 93 and the intake port 92 and various valves for opening and closing channel 95 and the intake and exhaust ports.

In the valve arrangement as shown in the drawings for exemplification, a rotary barrel valve 96 is provided in the interconnecting channel 95 to open and close it as desired and butterfly valves 97 and 98, either oscillating or rotating, are provided in intake port 92 and exhaust port 93, respectively.

As described herinbefore, a regulated amount of air is mixed with the exhaust gases prior to introducing the exhaust gases into the combustion chamber for recompression. In the preferred method illustrated in FIGURES 9-11, air is automatically introduced and mixed with the exhaust gases as these gases are expelled from exhaust chamber $V_3$, and diverted into intake chamber $V_2$. As in the reciprocating piston engine shown in FIGURES 1 and 2, in the rotary engine, the mixing of air with the exhaust gases is accomplished by a venturi 99 formed in the exhaust port 93. An air line 100 enters at the throat of the venturi. Check valve 101 blocks the escape of exhaust gases from the air line. The quantity of air introduced is controlled by butterfly valves 102 and 103, bimetallic choke spring 104 and lever 105 in the same manner as discussed hereinbefore in connection with the reciprocating piston engine.

In operation at full load, intake and exhaust valves 97 and 98 would be fully opened, and rotary barrel valve 96 and air control valve 103 would admit only that amount of air which will give the best balance between cooling due to the air and increased oxygen to give minimum emissions. The valves would remain in these positions until it is desired to decrease the engine load and employ a stratified charge.

To facilitate explanation of our invention, assume that it is desired to obtain a stratified charge of $EG/A$ mixture and min. NO $F/A$ mixture in the combustion chamber of the engine for operation at partial load.

In FIGURE 9, the rotor 90 (shown in full lines) is in a position in which ignition is taking place in chamber $V_1$, while intake is taking place in chamber $V_2$ and exhaust is taking place in chamber $V_3$. The power stroke for chamber $V_1$ continues until the chamber $V_1$ is opened to exhaust port as apex 90a of rotor 90 reaches port 93, as shown in broken lines in FIGURE 9.

Referring now to FIGURE 10, the intake and exhaust valves 97 and 98 are closed and rotary valve 96 and air control valve 103 are opened sometime after rotor apex 90b opens chamber $V_3$ to exhaust port 93, as shown in broken lines, and before chamber $V_2$ attains its maximum volume, as shown in full lines.

The exact point in the rotation of rotor 90 at which the valves 97 and 98 close and valves 96 and 103 open depends on the accelerator position; the valves 97 and 98 closing earlier and valves 96 and 103 opening earlier for lighter engine loads and later as the engine approaches full load.

For purposes of illustration assume that the accelerator position is such that valves 97 and 98 close and valves 96 and 103 open when the rotor 90 is in substantially the position shown in FIGURE 11. The intake of min. NO $F/A$ mixture from the carburetor shown schematically at 106 through the intake port 92 is thus cut off by intake valve 97 before chamber $V_2$ attains its maximum volume. Exhaust valve 98 closes and valves 96 and 103 open as shown, thereby passing the remaining products of combustion in volumetrically decreasing chamber $V_3$ together with air drawn in from air line 90 through connecting port 95 and valve 96 into volumetrically increasing chamber $V_2$ to form a stratified charge comprising $EG/A$ mixture and min. NO $F/A$ mixture in accordance with our new method.

While for purposes of illustration, we have shown the intake and exhaust valves 97 and 98 closing and rotary valve 96 and air control valve 103 opening approximately when the rotor 90 is in the position shown in FIGURE 11, these valves may be actuated at any time between the rotor positions shown in FIGURE 10 depending on the engine load desired. The quantity of exhaust gases transferred from the exhaust chamber $V_3$ to the intake chamber $V_2$ is controlled by varying the closing of intake and exhaust valves 97 and 98 and the opening of rotary valve 96. Where a smaller amount of min. NO $F/A$ mixture is necessary and a greater quantity of $EG/A$ mixture is desired in the stratified charge for relatively light engine loads, the closing of the valves 97 and 98 and the opening of valves 96 and 103 take place earlier than where a relatively greater amount of min. NO $F/A$ mixture is required and a lesser amount of $EG/A$ mixture is desired for the stratified charge for heavier engine loads.

The timing of valves 97, 98, 96 and 103 may be variably controlled in accordance with accelerator position by phase control mechanism such as shown in FIGS. 4–6 and described hereinbefore.

The particular construction and arrangement of valves shown herein are not intended as exclusive, but rather represent a simple application of our invention to a rotary piston engine.

We claim:

1. In internal combustion engines harnessing the energy released from the combustion of a mixture of fuel and air in a combustion chamber and having intake and exhaust ports, the method of maintaining a substantially constant ratio of fuel and air in the mixture for all ranges of engine load for improving fuel utilization and reducing objectionable exhaust emissions at partial engine loads, said method comprising:
   (a) providing a quantity of exhaust gases in the combustion chamber of the engine in inverse proportion to the engine load desired,
   (b) providing minimum NO fuel/air mixture in the combustion chamber,
   (c) varying the quantity of said minimum NO fuel/air mixture in proportion to the engine load desired to complement the quantity of exhaust gases provided in the combustion chamber to obtain substantially equal pressures in the combustion chamber at the start of the compression stroke at all ranges of engine load, and
   (d) maintaining said exhaust gases and said minimum NO fuel/air mixture in essentially stratified relationship in said combustion chamber prior to ignition to provide a stratified charge.

2. The method specified in claim 1 wherein the exhaust gases provided in the combustion chamber are maintained between said minimum NO fuel/air mixture and the exhaust port of the engine.

3. The method specified in claim 1 including introducing a quantity of air into said exhaust gas sufficient to completely oxidize said exhaust gas during the combustion process but less than that amount which would excessively reduce the reaction rate by cooling.

4. The method specified in claim 1 including expelling exhaust gas from the combustion chamber of the engine into an exhaust chamber, introducing air into said exhaust gas prior to entry into said exhaust chamber, drawing said exhaust gas and air out of said exhaust chamber and mixing additional air therewith to form an exhaust gas/air mixture.

5. The method specified in claim 3 including controlling the amount of air mixed with the exhaust gas as a function of engine temperature and engine load desired.

6. The method specified in claim 3 wherein a portion of the exhaust gases are retained in the combustion chamber from the previous combustion stroke and then mixing air with said exhaust gases to provide the exhaust gas/air portion of the stratified exhaust gas/air and minimum NO fuel/air charge.

7. In internal combustion engines utilizing the energy released from the combustion of a mixture of fuel and air in a combustion chamber and having intake and exhaust ports communicating with said combustion chamber, an improvement for maintaining a substantially constant ratio of fuel to air in said mixture for all ranges of engine load for improving fuel utilization and reducing objectionable exhaust omissions at partial engine loads, said improvement comprising:
   (a) means for providing an exhaust gas/air mixture in the combustion chamber of the engine,
   (b) means for varying the amount of air mixed with the exhaust gas as a function of engine temperature and engine load desired,
   (c) means for varying the quantity of said exhaust gas/air mixture in inverse proportion to the engine load desired,
   (d) means for providing minimum NO fuel/air mixture to form in the combustion chamber to form a stratified charge with said exhaust gas/air mixture, and
   (e) means for varying the quantity of said minimum NO fuel/air mixture introduced in proportion to the engine load desired to complement the quantity of exhaust gas/air mixture introduced to provide substantially equal pressures in the combustion chamber at the start of the compression stroke at all ranges of engine load.

8. The improvement specified in claim 7 including an air line and a venturi formed in the exhaust port of the engine for mixing air with the exhaust gas to form said exhaust gas/air mixture.

9. In four-cycle reciprocating piston internal combustion engines utilizing the energy released from the combustion of a mixture of fuel and air in a combustion chamber, and having intake and exhaust ports communicating with said combustion chamber, and a crankshaft, an improvement for maintaining a substantially constant ratio of fuel to air in said mixture for substantially all engine loads for improving fuel utilization and reducing objectionable exhaust emissions at partial engine loads, said improvement comprising:
   (a) an exhaust valve assembly comprising a main exhaust valve for opening and closing the exhaust port and an auxilliary exhaust timing valve positioned in series with said main exhaust valve in said exhaust port for introducing varying quantities of exhaust gas/air mixture into the combustion chamber of the engine in inverse proportion to the engine load desired, (b) venturi means formed in said exhaust port for mixing air with the exhaust gas to form said exhaust gas/air mixture, and (c) an intake valve assembly comprising a main intake valve for opening and closing the intake port and an auxiliary intake timing valve positioned in series with said main intake valve in said intake port for introducing varying quantities of minimum NO fuel/air mixture into the combustion chamber of the engine in proportion to the engine load desired to complement the quantity of exhaust gas/air mixture introduced to provide substantially equal pressures in the combustion chamber at the start of the compression stroke at all ranges of engine load.

10. In rotary internal combustion engines utilizing the energy released from the combustion of a mixture of fuel and air in a combustion chamber and having a rotor mounted for rotation in a casing, an intake port in said casing communicating with an intake chamber and an exhaust port in said casing communicating with an exhaust chamber, an improvement for maintaining a substantially constant ratio of fuel to air in said mixture for substantially all engine loads for improving fuel utilization and reducing objectionable exhaust emissions at partial engine loads, said improvement comprising:

(a) an exhaust valve in the exhaust port;

(b) means for closing said exhaust valve before all of the exhaust gas is exhausted from the exhaust chamber at partial engine loads, (c) an intake valve in the intake port, (d) means for closing said intake valve for partial engine loads before the pressure in said intake chamber reaches the maximum pressure obtained therein prior to compression when the engine is operating at full load, (e) a channel connecting said exhaust port with said intake port, (f) a third valve for opening and closing said connecting channel, (g) means for opening said third valve for partial engine loads when said intake and exhaust valve close for conveying the exhaust gas remaining in the exhaust chamber to the intake chamber, and (h) venturi means for introducing air into the exhaust gas being conveyed to the intake chamber to produce a stratified charge of minimum NO fuel/air mixture and an exhaust gas/air mixture for partial engine loads wherein the pressure and the intake chamber at the start of the compression is substantially the same for all ranges of engine load.

References Cited

UNITED STATES PATENTS

| | | | |
|---|---|---|---|
| 482,202 | 9/1892 | Schumm | 123—107 |
| 1,494,763 | 5/1924 | West. | |
| 1,623,384 | 4/1927 | Burtnett. | |
| 2,807,250 | 9/1957 | Mallory. | |
| 2,884,913 | 5/1959 | Heintz. | |
| 3,092,089 | 6/1963 | Dolza. | |
| Re. 25,578 | 5/1964 | Witzky. | |
| 3,241,536 | 3/1966 | Falzone. | |
| 3,315,650 | 4/1967 | Bishop et al. | 123—32 |

WENDELL E. BURNS, Primary Examiner

U.S. Cl. X.R.

123—1, 32, 75, 90, 106, 107, 188